J. LENZ.
LATHE DOG.
APPLICATION FILED DEC. 20, 1911.
1,035,979.
Patented Aug. 20, 1912.
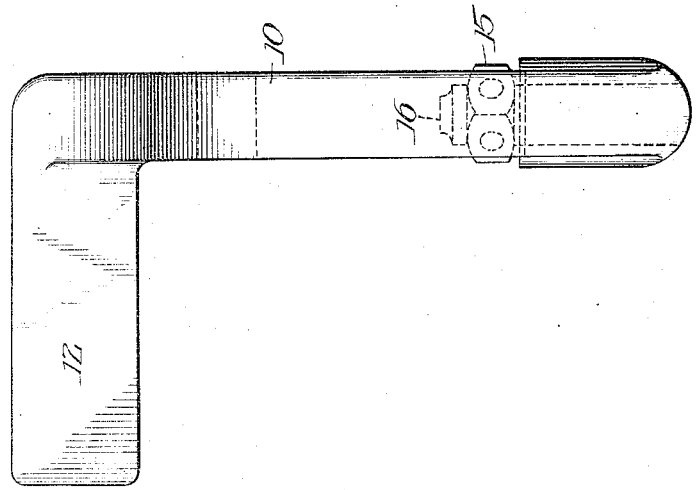
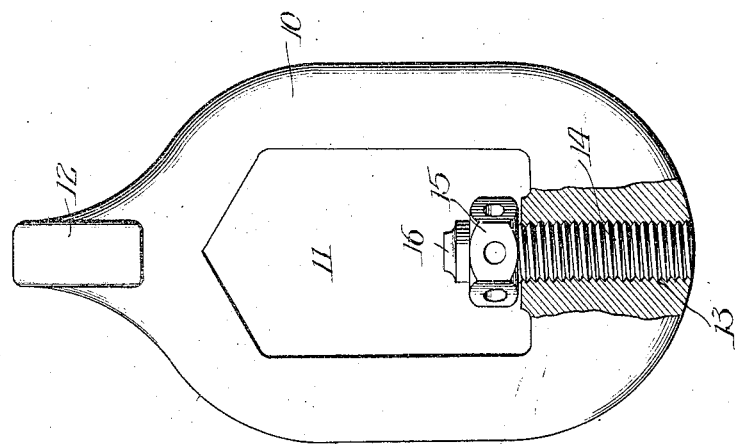

UNITED STATES PATENT OFFICE.

JACOB LENZ, OF HIBBING, MINNESOTA.

LATHE-DOG.

1,035,979.  Specification of Letters Patent.  Patented Aug. 20, 1912.

Application filed December 20, 1911. Serial No. 667,001.

*To all whom it may concern:*

Be it known that I, JACOB LENZ, a citizen of the United States, and resident of Hibbing, in the county of St. Louis and State of Minnesota, have invented certain new and useful Improvements in Lathe-Dogs, of which the following is a specification.

My invention relates to lathe dogs and has particular reference to a novel device of such description which shall have no projecting portions which might catch the clothing of an operator.

In the operation of lathes it is necessary to employ some means to cause the rotation of the work with the driving mechanism of the lathe. This is usually accomplished by means of an appliance called a lathe dog which is adapted to be clamped to the work by means of set screws or otherwise, the clamp having a right angled projection engaging with one of the recesses in the lathe head.

In many of the lathe dogs heretofore in use there have been projections such as the head of the set-bolt, etc., which are liable to and often do catch in the clothing of the operator and cause serious accidents.

Therefore one object of my invention is to produce a lathe dog which shall have no projecting parts, other than the arm which normally contacts the lathe head.

A further object is the provision of such a lathe dog which shall be cheap to manufacture and simple in operation.

My invention will be more readily understood by reference to the accompanying drawings, wherein, Figure 1 is an elevation showing one application of my novel safety device to a lathe dog, and Fig. 2 is an edge elevation of the same device.

Referring more particularly to the drawings it will be seen that the lathe dog which I prefer to use is of a well known form comprising an integral right angled member having a body portion 10, with a rectangular opening 11 formed therein. Projecting at right angles from one end of the body portion is an arm 12 which, as will be understood, enters an opening in or contacts an abutment on a lathe head. The work adapted to be acted on is clamped within the opening 11, by means of a suitable clamping device. However, as heretofore explained, the clamps commonly in use are set-bolts having their heads projecting beyond the outside dimensions of the body portion. This is undesirable inasmuch as such projections frequently catch in the operator's sleeve causing broken arms or other less serious injuries. I have therefore arranged a clamp which cannot in any position project outside of the body portion. In this instance the body portion is provided with a threaded opening 13, within which is seated the threaded shank 14 of a set-bolt. Said shank is provided with an octagonal head 15 and a work-contacting point 16. For convenience each one of the eight faces of the bolt head 15 may be provided with a perforation to assist in actuation of the bolt without the use of a wrench.

While the opening 13 in the body portion of the lathe dog is shown as extending entirely therethrough, it will be understood that it may be terminated near the edge of the body portion thus leaving a smooth outer edge. It will also be obvious that other modifications may be made and such modifications as are within the scope of the appended claims I consider within the spirit of my invention.

I claim:

1. A lathe dog comprising, in combination, a one-piece member having a work-receiving opening therein, and a clamp disposed entirely within the limits of said member and having a portion projecting within said opening, substantially as described.

2. A lathe dog comprising, in combination, a one-piece member having a work-receiving opening therein, a clamp disposed entirely within the limits of said member and having an actuating device within said opening, substantially as described.

3. A lathe dog comprising, in combination, a one-piece angular member having a work-receiving opening therein, a screw-clamp disposed entirely within the limits of said member, said screw clamp having an actuating head located within said opening, substantially as described.

JACOB LENZ.

Witnesses:
W. F. SULLIVAN,
W. J. WEST.

Copies of this patent may be obtained for five cents each, by addressing the "Commissioner of Patents, Washington, D. C."